(12) United States Patent
Asano

(10) Patent No.: US 9,110,227 B2
(45) Date of Patent: Aug. 18, 2015

(54) MOTOR DRIVE APPARATUS AND OPTICAL APPARATUS

(75) Inventor: Kota Asano, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 212 days.

(21) Appl. No.: 13/556,276

(22) Filed: Jul. 24, 2012

(65) Prior Publication Data

US 2013/0027791 A1 Jan. 31, 2013

(30) Foreign Application Priority Data

Jul. 26, 2011 (JP) .................................. 2011-162702

(51) Int. Cl.
| G05B 19/40 | (2006.01) |
| G02B 7/10 | (2006.01) |
| H02P 8/32 | (2006.01) |

(52) U.S. Cl.
CPC . *G02B 7/102* (2013.01); *H02P 8/32* (2013.01)

(58) Field of Classification Search
CPC ..................... G05B 19/40; G05B 2219/41326; H02P 8/14
USPC .................................................. 318/685, 696
See application file for complete search history.

(56) References Cited

U.S. PATENT DOCUMENTS

| 4,710,691 A | * | 12/1987 | Bergstrom et al. ........... 318/696 |
| 5,111,242 A | * | 5/1992 | Tanimoto et al. ............. 399/167 |
| 5,467,173 A | * | 11/1995 | Sakata et al. ................. 399/208 |
| 6,823,132 B2 | * | 11/2004 | Saito et al. .................... 388/806 |
| 6,911,800 B2 | * | 6/2005 | Kobayashi et al. ........... 318/685 |
| 7,009,824 B2 | * | 3/2006 | Takeuchi et al. ................ 361/23 |
| 7,019,481 B2 | * | 3/2006 | Kato et al. ..................... 318/610 |
| 7,208,905 B2 | * | 4/2007 | Shibatani ...................... 318/696 |
| 7,339,342 B2 | * | 3/2008 | Harada et al. ................. 318/685 |

FOREIGN PATENT DOCUMENTS

JP 2001178193 A 6/2001

* cited by examiner

*Primary Examiner* — Rina Duda
(74) *Attorney, Agent, or Firm* — Rossi, Kimms & McDowell LLP

(57) ABSTRACT

The motor drive apparatus includes a driven member, a stepping motor to drive the driven member, a driver to produce a drive signal for driving the stepping motor and whose signal value periodically changes, a memory to store data for setting a reference signal value as the signal value and a target movement amount of the driven member for each one-step drive of the stepping motor to be driven according to the drive signal having the reference signal value, and a detector to detect an actual movement amount of the driven member for each one-step drive of the stepping motor actually driven according to the drive signal having the reference signal value. The driver changes the signal value of the drive signal from the reference signal value to another signal value so as to reduce difference between the target movement amount and the actual movement amount.

11 Claims, 7 Drawing Sheets

MOTOR DRIVE APPARATUS AND OPTICAL APPARATUS

BACKGROUND OF THE INVENTION

1. Field of the Invention

The present invention relates to a motor drive apparatus configured to cause a steeping motor to drive a driven member and an optical apparatus such as an image pickup apparatus which includes the motor drive apparatus.

2. Description of the Related Art

A lot of optical apparatuses including a movable driven member such as an optical element or an image sensor and using a stepping motor as a driving source for driving the driven member are conventionally provided. The stepping motor rotates by an angle corresponding to the number of pulse signals supplied thereto to hold its stop position, so that drive of the stepping motor is generally controlled by simple open-loop control that only counts the number of the pulse signals supplied to the stepping motor.

However, in the open-loop control, detent torque that is load torque unique to the stepping motor or variation of movement load (load variation) that is generated during movement of the driven member deteriorates stop position accuracy of the stepping motor. Such deterioration of the stop position accuracy leads to deterioration of positional control accuracy of a focusing lens as the driven member in zooming or focusing, that is, deterioration of focusing performance.

Japanese Patent Laid-Open No. 2001-178193 discloses a closed-loop control method that provides, to a stepping motor, a sensor for detecting rotational angle of the stepping motor, and that performs feedback control so as to coincide an actual rotational angle of the stepping motor detected by the sensor with an instruction rotational angle therefor output from an instruction circuit.

However, the closed-loop control method for the stepping motor disclosed in Japanese Patent Laid-Open No. 2001-178193 does not consider the deterioration of the stop position accuracy due to the load variation in a case of installing the stepping motor to an actual optical apparatus and using the motor for driving the driven member.

SUMMARY OF THE INVENTION

The present invention provides a motor drive apparatus capable of suppressing the stop position accuracy of the stepping motor controlled by open-loop control from being deteriorated due to the detent torque or the lord variation in a state where the stepping motor is actually used for driving the driven member.

The present invention provides as one aspect thereof a motor drive apparatus including a driven member configured to be movable, a stepping motor configured to drive the driven member, a driver configured to produce a drive signal for driving the stepping motor and whose signal value periodically changes, a memory configured to store data for setting a reference signal value as the signal value and a target movement amount of the driven member for each one-step drive of the stepping motor to be driven according to the drive signal having the reference signal value, and a detector configured to detect an actual movement amount of the driven member for each one-step drive of the stepping motor actually driven according to the drive signal having the reference signal value. The driver is configured to change the signal value of the drive signal from the reference signal value to another signal value so as to reduce difference between the target movement amount and the actual movement amount.

The present invention provides as another aspect thereof an optical apparatus including a main body, and the above motor drive apparatus installed in the main body.

The present invention provides as still another aspect thereof a method for controlling a motor drive apparatus including a driven member configured to be movable and a stepping motor configured to drive the driven member. The method comprises a drive step of producing a drive signal for driving the stepping motor and whose signal value periodically changes, a step of providing data for setting a reference signal value as the signal value and a target movement amount of the driven member for each one-step drive of the stepping motor to be driven according to the drive signal having the reference signal value, and a step of detecting an actual movement amount of the driven member for each one-step drive of the stepping motor actually driven according to the drive signal having the reference signal value. The method changes, in the drive step, the signal value of the drive signal from the reference signal value to another signal value so as to reduce difference between the target movement amount and the actual movement amount.

The present invention provides as yet still another aspect thereof a recording medium storing a computer program for causing a computer in an optical apparatus provided with a motor drive apparatus including a driven member configured to be movable and a stepping motor configured to drive the driven member. The computer program includes a drive step of producing a drive signal for driving the stepping motor and whose signal value periodically changes, a step of providing data for setting a reference signal value as the signal value and a target movement amount of the driven member for each one-step drive of the stepping motor to be driven according to the drive signal having the reference signal value, and a step of detecting an actual movement amount of the driven member for each one-step drive of the stepping motor actually driven according to the drive signal having the reference signal value. The program causes, in the drive step, the computer to change the signal value of the drive signal from the reference signal value to another signal value so as to reduce difference between the target movement amount and the actual movement amount.

Further features and aspects of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
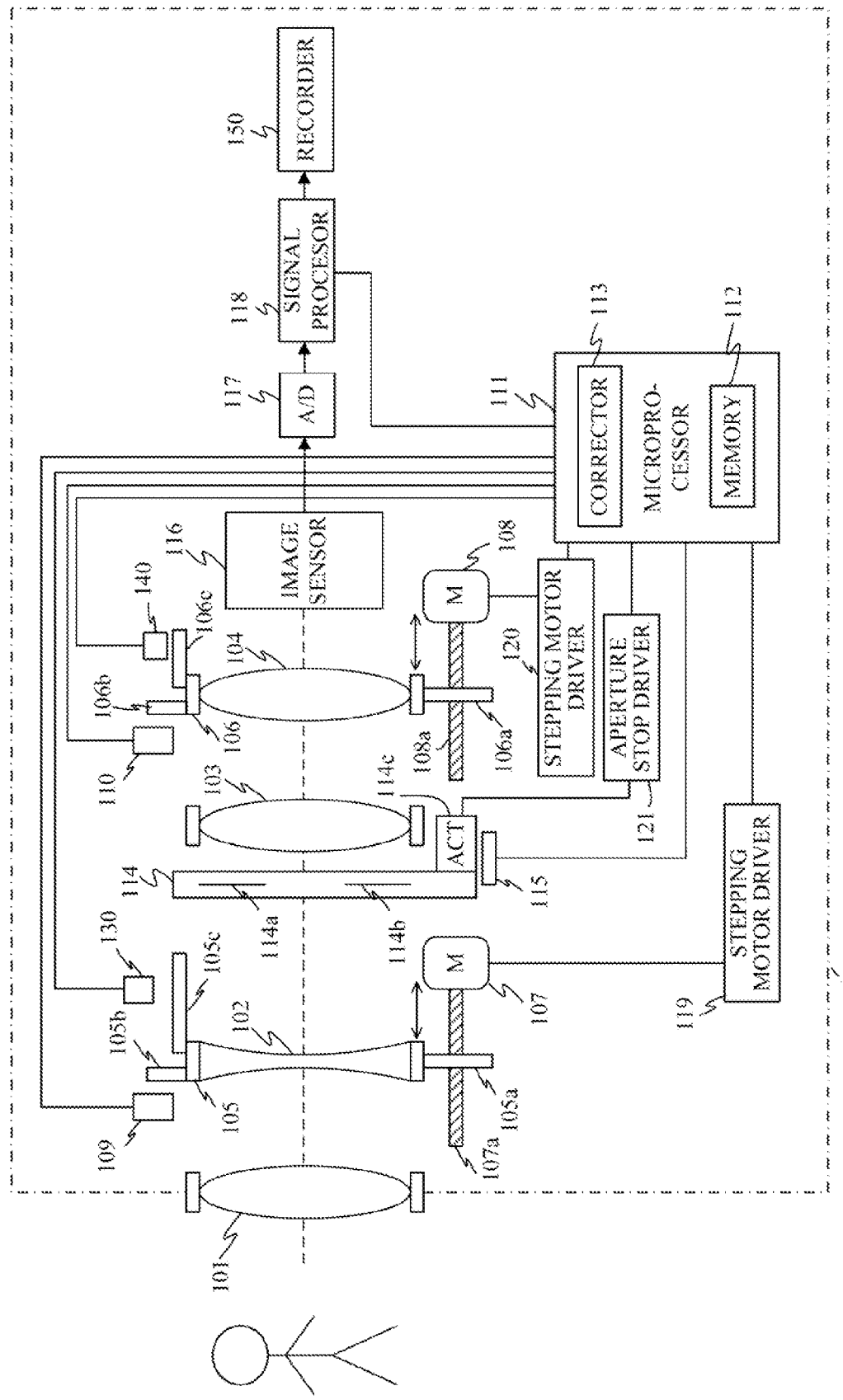
FIG. 1 is a block diagram showing a configuration of an image pickup apparatus that is an embodiment of the present invention.

FIG. 1 shows a configuration of an image pickup apparatus as an optical apparatus that is an embodiment of the present invention. Reference numeral 200 denotes a main body of the image pickup apparatus. In order from an object side, reference numeral 101 denotes a field lens, reference numeral 102 denotes a zoom lens as a magnification-varying lens, reference numeral 114 denotes an aperture stop unit to adjust amount of light, reference numeral 103 denotes an afocal lens, and reference numeral 104 denotes a focus lens (focusing lens). These lenses 101 to 104 and the aperture stop unit 114 constitute a rear focus type image taking optical system.

Reference numeral 116 denotes an image sensor (image pickup element) as a photoelectric conversion element such as a CCD sensor or a CMOS sensor. The image sensor 116 performs photoelectric conversion of an object image formed by the image taking optical system to produce an analog electric signal. The zoom lens 102 and the focus lens 104 are respectively held by a zoom lens holding frame 105 and a focus lens holding frame 106. These lens holding frames 105 and 106 are supported by a guiding bar (not shown) movably in a direction of an optical axis (hereinafter referred to as "an optical axis direction") of the image taking optical system. Each of a unit constituted by the zoom lens 102 and the zoom lens holding frame 105 holding the zoom lens 102 and a unit constituted by the focus lens 104 and the focus lens holding frame 106 holding the focus lens 104 corresponds to a driven member.

The lens holding frames 105 and 106 are respectively provided with racks 105a and 106a attached thereto. The racks 105a and 106a respectively engage with screw portions of screw shafts 107a and 108a that are output shafts of stepping motors 107 and 108. Therefore, rotational drive of each of the stepping motors 107 and 108 rotates each of the screw shafts 107a and 108a, and thereby each of the lens holding frames 105 and 106 is moved in the optical axis direction shown by an arrow in FIG. 1 by engagement action of the screw shaft and the rack.

When the stepping motors 107 and 108 drive the zoom lens 102 and the focus lens 104 to their target positions, they first drive, at start-up of the image pickup apparatus, the lenses 102 and 104 to their reference positions (hereinafter referred to as "reset positions") for lens position control. For detection of the reset positions of the zoom and focus lenses 102 and 104, reset position sensors (photointerrupters each including a light emitter and a light receiver which are integrated with each other) 109 and 110 are provided. The detection that the zoom and focus lenses 102 and 104 are located at the reference positions are made by entering of light blocking portions 105b and 106b formed in the lens holding frames 105 and 106 between the light emitter and the light receiver of the photointerrupters 109 and 110.

The light blocking portion 105b has a shape enabling zoom zone detection that detects whether the zoom lens 102 is located in a telephoto side zone or a wide-angle side zone. The light blocking portion 106b has a shape enabling focus zone detection that detects whether the focus lens 104 is located in a zone for focusing on far distance objects or a zone for focusing on close distance objects.

Thereafter, command signals are input to stepping motor drivers 119 and 120 from a microprocessor 111. The command signals are signals causing the stepping motor drivers 119 and 120 to drive the stepping motors 107 and 108 by a number of steps required for moving the zoom lens 102 and the focus lens 104 from the reset positions to the target positions. Each of the stepping motor drivers 119 and 120 produces a drive signal for rotatably driving each of the stepping motors 107 and 108 by the number of steps instructed by the input command signal. The drive signal in this embodiment is formed by two phase current signals whose signal values periodically (cyclically) change. The drive signal (drive current signals) is supplied to coils of each of the stepping motors 119 and 120 to excite the coils, and thereby each of the stepping motors 119 and 120 rotates to move each of the zoom and focus lenses 102 and 104. The microprocessor 111 and the stepping motor drivers 119 and 120 constitute a driver.

The zoom lens holding frame 105 is provided with a zoom position scale 105c fixed thereto. The zoom position scale 105c is used for detection of position of the zoom lens 102. Moreover, a zoom position sensor 130 is fixed to a part of a lens barrel (not shown) which faces the zoom position scale 105c. The zoom position scale 105c has scale patterns formed periodically in the optical axis direction, such as magnetic patterns or light reflective patterns. The zoom position sensor 130 outputs a detection signal whose value changes according to its position relative to the scale 105c that is moved with the zoom lens holding frame 105, the detection signal having a trigonometric function waveform with respect to a time axis. Thus, the position of the zoom lens 102 is calculable as a value corresponding to a sine angle or a cosine angle. The detection signal output from the zoom position sensor 130 is input to the microprocessor 111 that performs position control of the zoom lens 102 by using the detection signal.

Similarly, the focus lens holding frame 106 is provided with a focus position scale 106c fixed thereto. The focus position scale 106c is used for detection of position of the focus lens 102. Moreover, a focus position sensor 140 is fixed to a part of the lens barrel which faces the focus position scale 106c. The focus position scale 106c also has scale patterns formed periodically in the optical axis direction, such as magnetic patterns or light reflective patterns. The focus position sensor 140 outputs a detection signal whose value changes according to its position relative to the scale 106c that is moved with the focus lens holding frame 106, the detection signal having a trigonometric function waveform with respect to a time axis. Thus, the position of the focus lens 104 is also calculable as a value corresponding to a sine angle or a cosine angle. The detection signal output from the focus position sensor 140 is input to the microprocessor 111 that performs position control of the focus lens 104 by using the detection signal.

The aperture stop unit 114 includes an aperture stop actuator 114c, aperture stop blades 114a and 114b that are driven in opening and closing directions by the aperture stop actuator 114c, and a position detection element (hall element) 115 that detects an open/close state of the aperture stop blades 114a and 114b. The aperture stop actuator 114c is driven by an aperture stop driver 121.

The electric signal as an analog signal produced by the photoelectric conversion by the image sensor 116 is converted into a digital image capturing signal by an A/D converter 117 to be input to a signal processor 118. The signal processor 118 performs various image processes on the input digital image capturing signal to produce a video signal (image). The video signal is recorded to a recording medium through a recorder 150 and is displayed on a monitor in a display unit (not shown).

The microprocessor 111 governs control of all operations of the image pickup apparatus in response to input from operation switches such as a power switch, a recording switch and a zoom switch (not shown). In a memory 112 included in the microprocessor 111, a telephoto side position and a wide-angle side position (that is, a telephoto end and a wide-angle end) relative to the reset position of the zoom lens 102 are stored (provided) as position data for telephoto and wide-angle end detection of the zoom lens 102 by the zoom position sensor 130. Moreover, the microprocessor 111 drives the stepping motors 107 and 108 through the stepping motor drivers 119 and 120 to cause the image taking optical system to perform operations for variation of magnification and focusing. The microprocessor 111 performs correction of image plane variation with the variation of magnification by an electronic cam method, that is, by controlling the stepping motors 107 and 108 according to electronic cam data stored in the memory 112. Furthermore, the microprocessor 111 drives the aperture stop actuator 114c through the aperture stop driver 121 to appropriately set luminance of the object image to be subjected to the photoelectric conversion by the image sensor 116.

The memory 112 further stores data to be used for setting a reference signal value as a signal value (current value) of the drive signal to be supplied from each of the stepping motor driver 119 and 120 to each of the stepping motors 107 and 108. The reference signal value will be described later in detail. In addition, the memory 112 stores target movement amounts of the zoom and focus lenses 102 and 104 for one-step drive of the stepping motors 107 and 108 when driving the stepping motors 107 and 108 by supplying the drive signal having the reference signal value to each of the stepping motors 107 and 108.

The stepping motors 107 and 108 may be driven by any of driving methods such as a microstep driving method, a one-two phase driving method and a two-two phase driving method.

Moreover, the microprocessor 111 is provided with a corrector 113 that corrects the signal values (current values) of the drive signals supplied from the stepping motor drivers 119 and 120 to the stepping motors 107 and 108. This corrector 113 will be described later in detail.

Next, an operation principle of a two-phase PM stepping motor to be used as the stepping motors 107 and 108 in this embodiment will be described with reference to FIGS. 2 and 3A to 3D. In the following description, two phase coils (not shown) of the two-phase PM stepping motor are referred to as "an A-phase coil" and "a B-phase coil". The two-phase PM stepping motor has a generally known configuration, and therefore description thereof is omitted.

Figure 2:
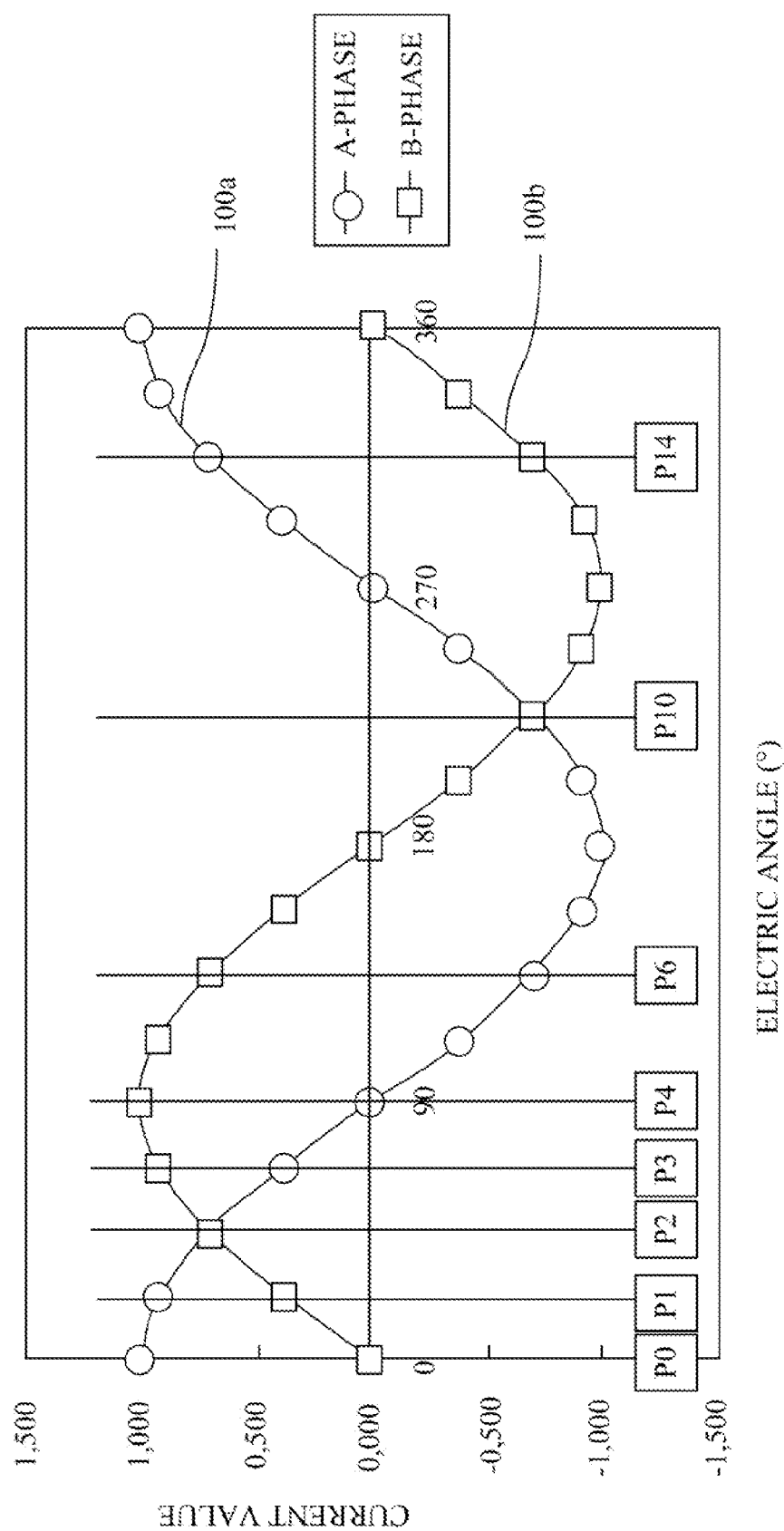
FIG. 2 shows waveform of a reference drive current for a stepping motor installed in the image pickup apparatus of the embodiment.

FIG. 2 shows waveforms of non-corrected drive current signals for driving the stepping motor, that is, drive current signals each having the reference current value (reference signal value) set on the basis of the data stored in the memory 112. A horizontal axis shows electric angle, and a vertical axis shows current value. In the following description, the drive current signal is simply referred to as "a drive current". A curved line 100a shows a cosine waveform of the drive current to be supplied to the A-phase coil, and a curved line 100b shows a sine waveform of the drive current to be supplied to the B-phase coil. Reference characters P0 to P14 denote excitation statuses; the drive currents to be supplied to the A- and B-phase coils in each excitation status have current values different from those in the other excitation statuses.

FIGS. 3A to 3D show relative positional relationships among a magnet 100c, an A-phase stator 100d and a B-phase stator 100e. The magnet 100c is a rotor of the two-phase PM stepping motor, and the A- and B-phase stators 100d and 100e generate magnetic poles when the drive currents are supplied to the A-phase coil and the B-phase coil. In the two-phase PM stepping motor, the magnet 100c has totally ten poles including N-poles and S-poles alternately magnetized in its circumferential direction (only eight poles are shown in FIGS. 3A to 3D). For example, when driving this stepping motor by a one-two phase driving method, a rotational angle for each one-step drive is 9°. The A-phase stator 100d and the B-phase stator 100e are disposed so as to surround periphery of the magnet 100c and such that their phases are mutually shifted by about 90°.

When the drive currents are supplied to the A-phase coil and the B-phase coil, the magnetic poles are generated in the A-phase stator 100d and the B-phase stator 100e and attract the magnetic poles of the magnet 100c. Thereby, the magnet 100c stops at a rotational angle where magnetic forces are balanced.

Figure 3A:
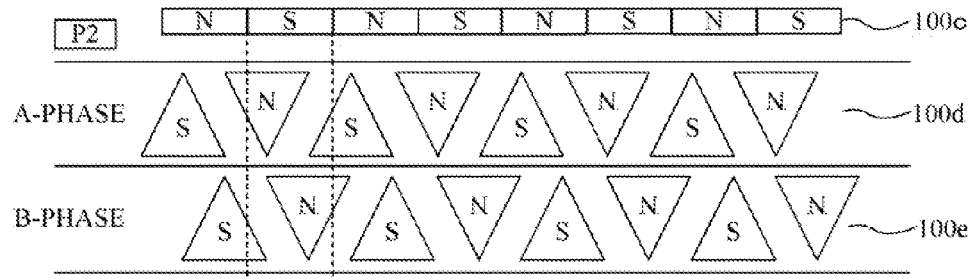
FIGS. 3A to 3D schematically show operations of the stepping motor.
Figure 3B:
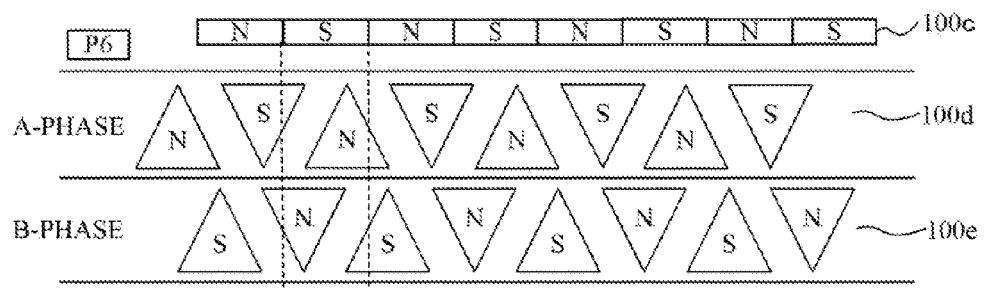
Figure 3C:
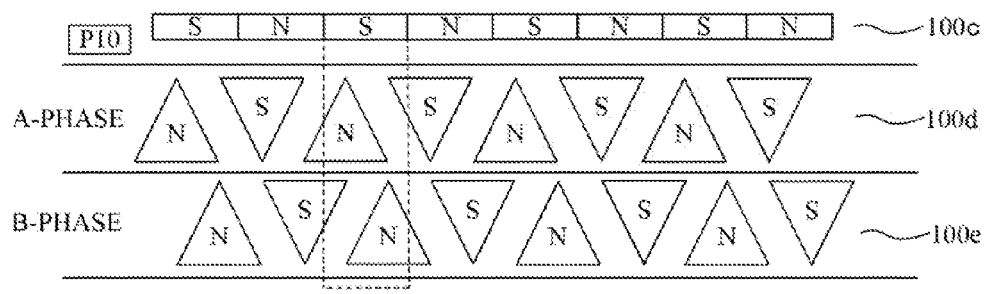
Figure 3D:
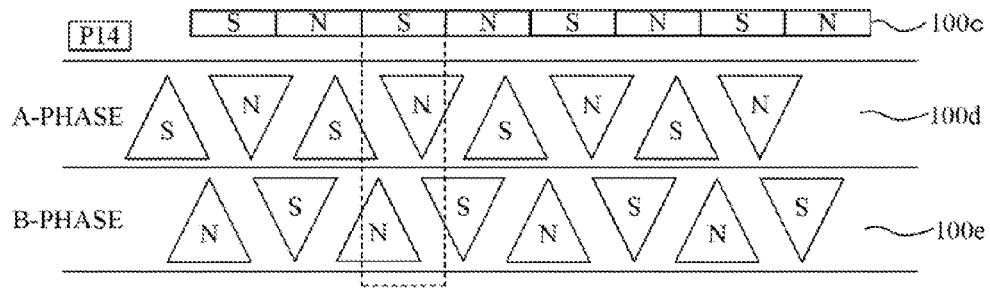

FIG. 3A shows the relative positional relationship among the magnet 100c, the A-phase stator 100d and the B-phase stator 100e in the excitation status shown by P2 in FIG. 2. FIG. 3B shows the relative positional relationship thereamong in the excitation status shown by P6 in FIG. 2, FIG. 3C shows the relative positional relationship thereamong in the excitation status shown by P10 in FIG. 2, and FIG. 3D shows the relative positional relationship thereamong in the excitation status shown by P14 in FIG. 2. As shown in FIGS. 3A to 3D, supply of the drive currents having a phase difference and whose current values periodically change to the A- and B-phase coils rotates the magnet 100c, which drives the stepping motor.

Figure 6:
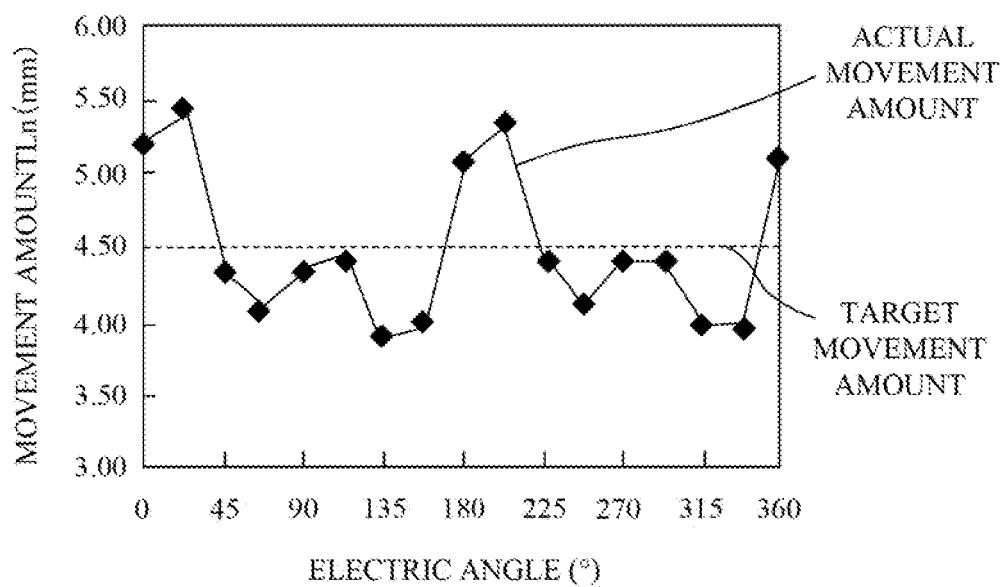
FIG. 6 shows actual and target movement amounts of a focus lens for the waveform of the reference drive current in the embodiment.

FIG. 6 shows an actual movement amount of the focus lens 104 obtained through the focus position sensor 140 for each one-step drive of the stepping motor 108 actually driven by supply of the non-corrected drive currents. A horizontal axis shows electric angle, and a vertical axis shows movement amount. FIG. 6 shows the movement amount of the focus lens 104 by angle in order to show the electric angle and mechanical angle of the stepping motor in a same figure.

Essentially, the supply of the non-corrected drive currents to the stepping motor 108 should provide the actual movement amount of the focus lens 104 that coincides with the target movement amount for each one-step drive (shown by a dotted line in FIG. 6) which is stored in the memory 112. However, influence of detent torque that is load torque unique to the stepping motor or influence of load variation during the drive of the focus lens 104 generates difference of the actual movement amount of the focus lens 104 from the target movement amount. Moreover, the difference greatly changes every one-step drive. Thus, this embodiment corrects (changes) the drive currents so as to reduce this difference.

Figure 4:
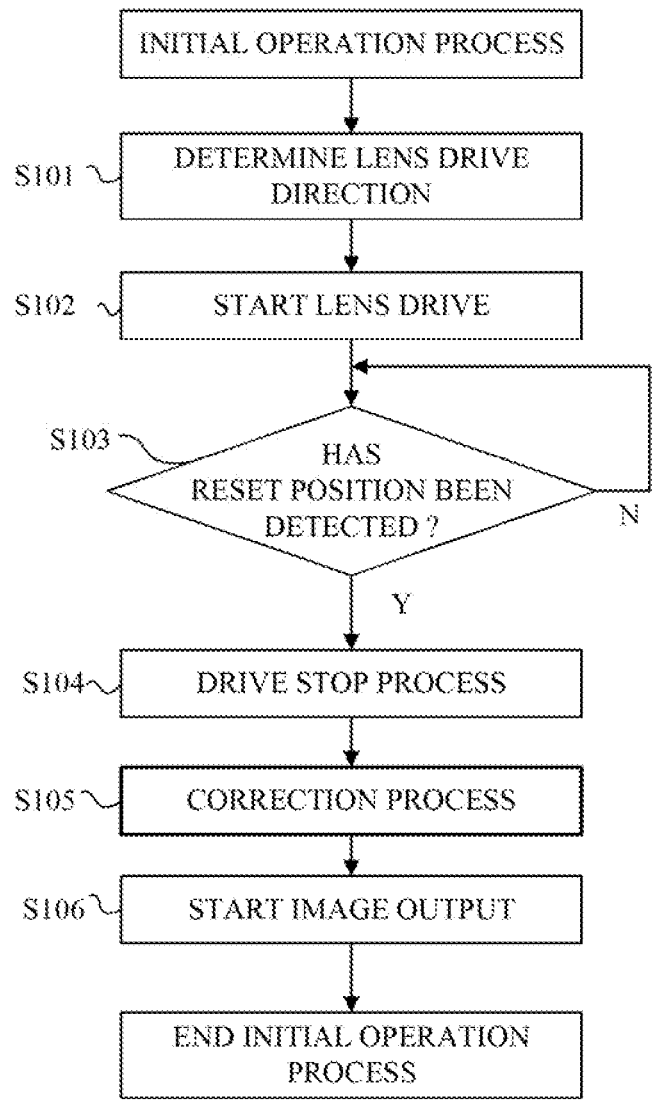
FIG. 4 is a flowchart showing an initial operation process in the embodiment.

First, FIG. 4 shows a flowchart of an initial operation process performed by the microprocessor 111 in response to power-on of the image pickup apparatus. The following is description of the initial operation process relating to the focus lens 104 moved by the stepping motor 108; a similar initial operation process is performed for the zoom lens 102 moved by the stepping motor 107. Moreover, the microprocessor 111 as a computer performs the initial operation process including a correction process for the drive currents, which will be described later, according to an optical apparatus controlling program as a computer program.

In response to the power-on of the image pickup apparatus, the microprocessor 111 starts a series of initializing processes, and then performs a focus reset operation that moves the focus lens 104 to its reset position. Specifically, at step S101, the microprocessor 111 first determines a drive direction of the stepping motor 108 to move the focus lens 104 to the reset position by using output from the photointerrupter 110. Then, at step S102, the microprocessor 111 drives the stepping motor 108 in the determined drive direction to start movement of the focus lens 104.

Next, at step S103, the microprocessor 111 determines whether or not an output level of the photointerrupter 110 changes, that is, whether or not detection (reset position detection) that the focus lens 104 has reached the reset position is made. If the reset position detection is made, the microprocessor 111 proceeds to step S104.

At step S104, the microprocessor 111 performs drive stop process for the stepping motor 108 and a process for setting an internal position counter, and then ends the focus reset operation.

Next, at step S105, the microprocessor 111 performs the correction process that corrects the drive currents to be supplied to the stepping motor 108. The correction process will be described later in detail. Then, at step S106, the microprocessor 111 starts output of the video signal (image) produced by using the image sensor 116, and ends the initial operation process at the time of the power-on.

Figure 5:
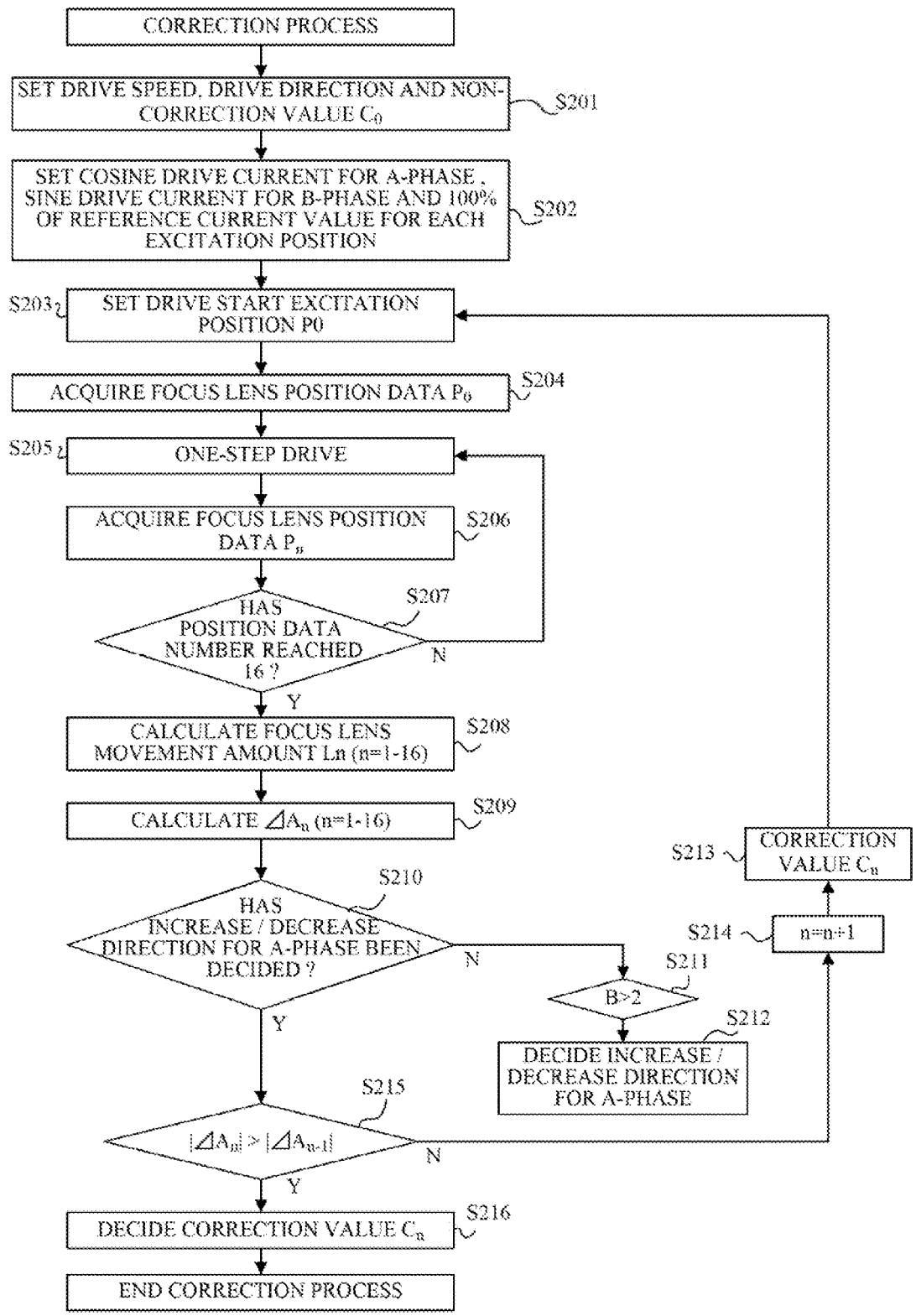
FIG. 5 is a flowchart showing a drive current correction process in the embodiment.

Next, description will be made of the correction process for the drive currents to be supplied to the stepping motor 108 by using a flowchart shown in FIG. 5. The following is description of a case of employing half-step drive as the driving method for the stepping motor 108 and of performing the correction process on one period (one cycle) of the drive current to be supplied to the A-phase coil of the stepping motor 108.

The half-step drive (half-step driving method) enables the stepping motor to stop more minutely, as compared with the one-two phase driving method, at positions including not only at a one-phase position and a two-phase position but also at an intermediate position therebetween, which provides a mechanical angle of 4.5° as rotational angle for each one-step drive, that is, a stop position resolution of twice that of the one-two phase driving method.

First, at step S201, the microprocessor 111 sets a drive speed and a drive direction for the stepping motor 108, and sets a correction value of the drive current to a non-correction value $C_0$. In this case, the drive current value becomes the reference current value.

Next, at step S202, the microprocessor 111 sets a cosine drive current to be supplied to the A-phase coil and a sine drive current to be supplied to the B-phase coil. The microprocessor 111 further sets the drive current value in each of the excitation statuses (hereinafter also referred to as "excitation positions") to a value of 100% of the reference current value. Thus, the drive current values shown in FIG. 2 are set for the A- and B-phase coils.

Next, at step S203, the microprocessor 111 sets a drive start excitation position of the stepping motor 108 to the excitation position P0 in FIG. 2.

Next, at step S204, the microprocessor 111 acquires position data $P_0$ of the focus lens 104 at the drive start excitation position P0 from the focus position sensor 140. This excitation position P0 corresponds to a position of an electric angle of 0° shown in FIG. 6.

Next, at step S205, the microprocessor 111 rotates the stepping motor 108 to the excitation position P1 by one-step drive in the half-step drive.

Then, at step S206, the microprocessor 111 acquires position data $P_1$ of the focus lens 104 at the excitation position P1 from the focus position sensor 140. This excitation position P1 corresponds to a position of an electric angle of 22.5° shown in FIG. 6.

Moreover, at step S207, the microprocessor 111 repeats the processes at steps S205 and S206 until the number of the position data of the focus lens 104 reaches 16, that is, until the excitation position reaches P16.

Next, at step S208, the microprocessor 111 acquires movement amounts (actual movement amounts) $L_n$ by which the focus lens 104 is actually moved for the respective one-step drives in the half-step drive by the following calculation:

$$L_n = P_{n+1} - P_n \ (n=0 \ to \ 15)$$

Then, at step S209, the microprocessor 111 calculates, for each one-step drive, a difference $\Delta A_n$ (n=0 to 15) between the actual movement amount $L_n$ of the focus lens 104 acquired at step S208 and the target movement amount (corresponding to the mechanical angle of 4.5°) stored in the memory 112.

Next, at step S210, the microprocessor 111 determines whether or not a decision has been made of a direction for increasing or decreasing the drive current value to be supplied to the A-phase coil so as to reduce the difference $\Delta A_n$ at each excitation position. The direction is hereinafter referred to as "an increase/decrease direction". The increase means an increase of the drive current value to a value higher than the value of 100% of the reference current value, and the decrease means a decrease thereof to a value lower than the value of 100% of the reference current value.

Since the increase/decrease direction has not been yet clear at start time of the correction process, the microprocessor 111 samples, at step S 211, change of the difference $\Delta A_n$ for increase and decrease of the drive current value plural times (B>2). Then, at step S212, the microprocessor 111 decides the increase/decrease direction in which the difference $\Delta A_n$ reduces toward zero. Although this embodiment uses the sampling number of times B larger than two, the sampling number of times B may be changed as needed.

The microprocessor 111 causes the corrector 113 to set a drive current value after the increase or decrease, that is, a corrected drive current value, such that the difference $\Delta A_n$ reduces toward zero. The following is description of processes after the increase/decrease direction for the drive current value has been decided by the above-described processes.

If the decision of the increase/decrease direction for the drive current value has been made at step S210, the microprocessor 111 proceeds to subsequent step S215 to determine whether or not an absolute value of the movement amount difference $\Delta A_n$ of the focus lens 104 is larger than an absolute value of the movement amount difference $\Delta A_{n-1}$ thereof for the corrected drive current value at one previous one-step drive. This determination (comparison) enables acquisition of an optimal corrected drive current value. If a determination that the absolute value of the movement amount difference $\Delta A_n$ is larger than the absolute value of the movement amount difference $\Delta A_{n-1}$ at the one previous one-step drive, the microprocessor 111 proceeds to step S216.

At step S216, the microprocessor 111 acquires, from previously stored data of $\Delta A_n$, a corrected drive current value (hereinafter referred to as "a correction value") $C_n$ by which a minimum value of the movement amount difference $\Delta A_n$ was previously obtained, and decides it as an optimal correction value. Then, the microprocessor 111 ends the correction process.

In the process at step S215, the microprocessor 111 makes the determination not on the basis of one increase of $\Delta A_n$ but on the basis of several changes thereof, which enables improvement of decision accuracy of the optimal correction value.

Figure 7:
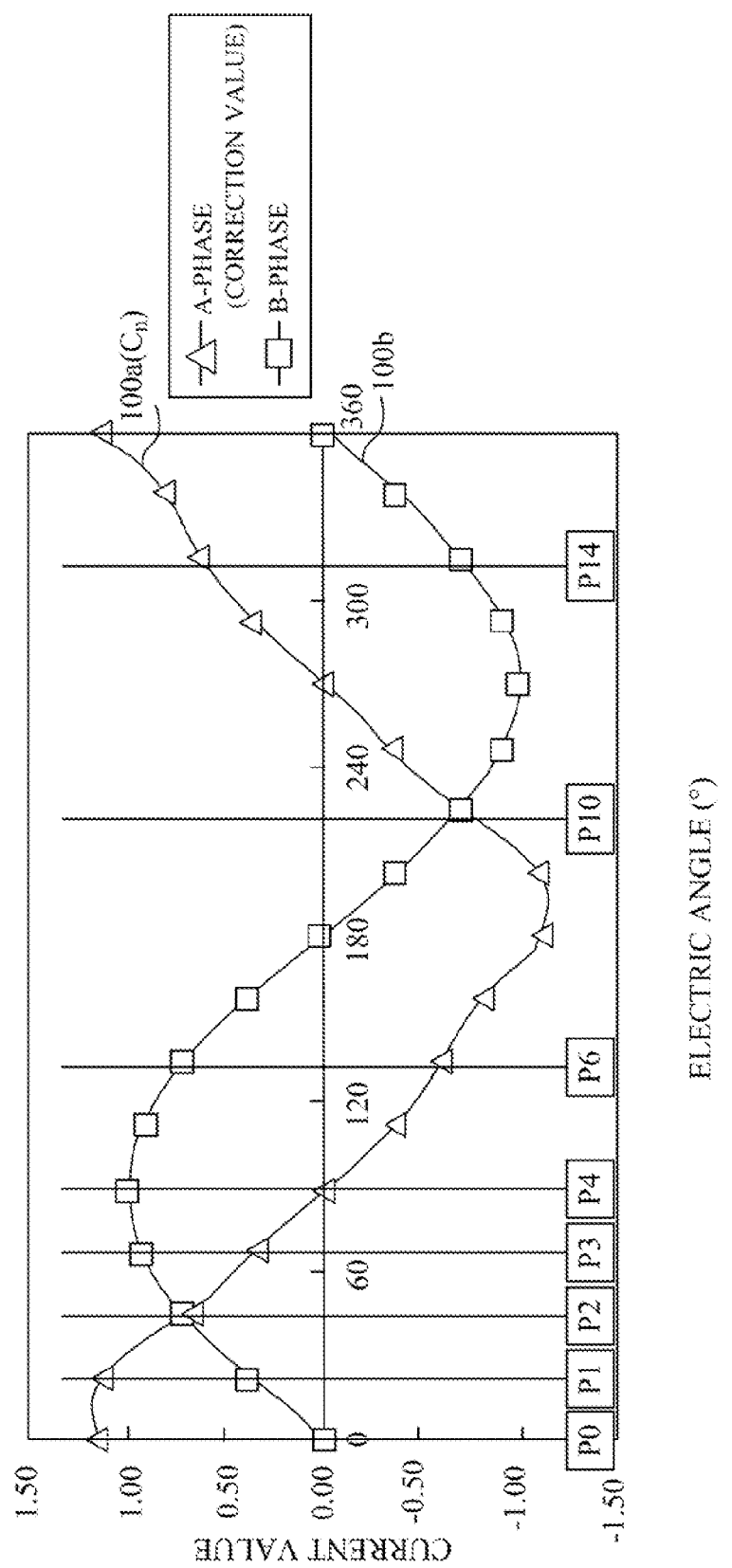
FIG. 7 shows waveform of corrected drive currents in the embodiment.

The correction value $C_n$ for the A-phase coil acquired by the above-described correction process is stored in the memory 112, and, thereafter, data of one period of this correction value $C_n$ is applied to the drive of the stepping motor 108 as a new reference current value. Current values on the curved line 100a in FIG. 7 indicate the correction values $C_n$ decided by the above-described correction process.

This embodiment enables change (increase or decrease) of the drive current value to be supplied to the stepping motor 108 to a value different from the reference current value for each excitation status, which makes it possible to reduce the difference between the actual movement amount of the focus lens 104 for each one-step drive and the target movement amount shown in FIG. 6 to almost zero. The term "almost zero" may be complete zero and may be a value of 0.5% or less (more desirably 0.2% or less).

Thus, this embodiment can solve the problem of the deterioration in stop position accuracy due to the influence of the detent torque unique to the stepping motor 108, the influence of the load variation during the drive of the focus lens 104 and others, which enables focus lens position control with high accuracy.

Moreover, this embodiment enables focus lens movement control with an equal amplitude in reciprocating drive of the focus lens 104 with a minute amplitude. On the other hand, applying the above-described correction process to the stepping motor 107 enables positioning of the zoom lens 102 with high positional resolution and high accuracy when driving the zoom lens 102 in a range close to the telephoto end. In addition, this embodiment enables constant position rotation of the stepping motor, which suppresses rotational unevenness of the stepping motor, and thereby generation of vibration and noise due to the rotational unevenness can be suppressed.

The memory 112 may store data for setting the reference signal value and target movement amounts, for each drive speed of the stepping motor and each drive direction thereof. This case enables the correction process of the drive current value according to difference between the target movement amount corresponding to the drive speed and drive direction when actually driving the stepping motor and the actual movement amount.

Moreover, although this embodiment detects the actual movement amount of the focus lens 104 by driving the stepping motor 108 by one period of the drive signal (that is, corresponding to the excitation positions P0 to P16), the actual movement amount may be detected by driving the stepping motor more than one period of the drive signal. Such drive of the stepping motor more than one period of the drive signal can further suppress the deterioration of the stop position accuracy due to the influence of the load variation. In order to suppress the deterioration of the stop position accuracy due to the influence of the load variation, it is most desirable to detect the actual movement amount by driving the stepping motor in an entire movable range of the driven member.

Furthermore, although this embodiment described the case of detecting the actual movement amount of the lens by using the position sensor, the actual movement amount may be detected by using an external measurement device such as a photonics sensor or by using a video signal produced from output of an image sensor.

In addition, although the embodiment described the case of performing the correction process of the drive signal in the initial operation process of the image pickup apparatus, the correction process may be performed in an assembly process for the image pickup apparatus in a factory or may be performed every time or periodically before start of a normal image capturing operation of the image pickup apparatus.

Moreover, although this embodiment described the case of moving an optical element such as the zoom lens or the focus lens in the optical axis direction by using the stepping motor, other optical elements such as an image blur correction lens may be moved by using a stepping motor in directions orthogonal to the optical axis direction. Furthermore, the image sensor may be moved as a driven member in the optical axis direction during the zooming by a stepping motor or may be moved in directions orthogonal to the optical axis direction for image blur correction.

Furthermore, the present invention is not limited to these embodiments and various variations and modifications may be made without departing from the scope of the present invention.

This application claims the benefit of Japanese Patent Application No. 2011-162702, filed on Jul. 26, 2011 which is hereby incorporated by reference herein in its entirety.

What is claimed is:

1. A motor drive apparatus comprising:
    a driven member configured to be movable;
    a stepping motor configured to drive the driven member;
    a driver configured to produce a drive signal for driving the stepping motor whose signal value periodically changes and which allows the stepping motor to be driven one step by one step;
    a memory configured to store (a) data for setting a reference signal value as the signal value and (b) a target movement amount of the driven member for each one-step drive of the stepping motor; and
    a detector configured to detect an actual movement amount of the driven member for each one-step drive of the stepping motor,
        wherein the driver is configured to produce a second drive signal which is different from a first drive signal having the reference signal value, and
    wherein a difference between the target movement amount and the actual movement amount when the stepping motor is driven according to the second drive signal is smaller than a difference between the target movement amount and the actual movement amount when the stepping motor is driven according to the first drive signal.

2. A motor drive apparatus according to claim 1, wherein the memory is configured to store the data and the target movement amount for each drive speed and each drive direction of the stepping motor, and
    wherein the driver is configured to produce the second drive signal according to the difference between the target movement amount for the drive speed and the drive direction when the stepping motor is actually driven and the actual movement amount.

3. A motor drive apparatus according to claim 1, wherein the driver is configured to detect the actual movement amount of the driven member by driving the stepping motor more than one period of the drive signal.

4. A motor drive apparatus according to claim 1, wherein the driven member is an optical element.

5. A motor drive apparatus according to claim 4, wherein the optical element is one of a magnification-varying lens and a focusing lens.

6. A motor drive apparatus according to claim 1, wherein the driven member is an image sensor.

7. An optical apparatus comprising:
    a main body; and
    a motor drive apparatus installed in the main body,
    wherein the motor drive apparatus comprising:
    a driven member configured to be movable;
    a stepping motor configured to drive the driven member;

a driver configured to produce a drive signal for driving the stepping motor whose signal value periodically changes and which allows the stepping motor to be driven one step by one step;

a memory configured to store (a) data for setting a reference signal value as the signal value and (b) a target movement amount of the driven member for each one-step drive of the stepping motor; and a detector configured to detect an actual movement amount of the driven member for each one-step drive of the stepping motor, wherein the driver is configured to produce a second drive signal which is different from a first drive signal having the reference signal value, and wherein a difference between the target movement amount and the actual movement amount when the stepping motor is driven according to the second drive signal is smaller than a difference between the target movement amount and the actual movement amount when the stepping motor is driven according to the first drive signal.

8. A method for controlling a motor drive apparatus including a driven member configured to be movable and a stepping motor configured to drive the driven member, the method comprising:

a drive step of producing a drive signal for driving the stepping motor whose signal value periodically changes and which allows the stepping motor to be driven one step by one step;

a step of providing (a) data for setting a reference signal value as the signal value and (b) a target movement amount of the driven member for each one-step drive of the stepping motor; and a step of detecting an actual movement amount of the driven member for each one-step drive of the stepping motor, wherein in the drive step, the method produces a second drive signal which is different from a first drive signal having the reference signal value, and wherein a difference between the target movement amount and the actual movement amount when the stepping motor is driven according to the second drive signal is smaller than a difference between the target movement amount and the actual movement amount when the stepping motor is driven according to the first drive signal.

9. A non-transitory computer readable recording medium storing a computer program for causing a computer, in an optical apparatus provided with a motor drive apparatus including a driven member configured to be movable and a stepping motor configured to drive the driven member, to control the motor drive apparatus, the control of the motor drive apparatus comprising:

a drive step of producing a drive signal for driving the stepping motor whose signal value periodically changes and which allows the stepping motor to be driven one step by one step;

a step of providing (a) data for setting a reference signal value as the signal value and (b) a target movement amount of the driven member for each one-step drive of the stepping motor; and a step of detecting an actual movement amount of the driven member for each one-step drive of the stepping motor, wherein the program causes, in the drive step, the computer to produce a second drive signal which is different from a first drive signal having the reference signal value, and wherein a difference between the target movement amount and the actual movement amount when the stepping motor is driven according to the second drive signal is smaller than a difference between the target movement amount and the actual movement amount when the stepping motor is driven according to the first drive signal.

10. A motor drive apparatus comprising:

a driven member configured to be movable;

a stepping motor configured to drive the driven member;

a driver configured to produce a drive signal for driving the stepping motor whose signal value periodically changes and which allows the stepping motor to be driven one step by one step;

a memory configured to store data for setting the signal value; and a detector configured to detect an actual movement amount of the driven member for each one-step drive of the stepping motor, wherein the memory is configured to store data for setting a signal value of a second drive signal which is different from a first drive signal having a reference signal as the signal value wherein the driver is configured to produce the second drive signal, and wherein a difference between the target movement amount and the actual movement amount when the stepping motor is driven according to the second drive signal is smaller than a difference between the target movement amount and the actual movement amount when the stepping motor is driven according to the first drive signal.

11. An optical apparatus comprising:

a main body; and a motor drive apparatus installed in the main body, wherein the motor drive apparatus comprising:

a driven member configured to be movable;

a stepping motor configured to drive the driven member;

a driver configured to produce a drive signal for driving the stepping motor whose signal value periodically changes and which allows the stepping motor to be driven one step by one step;

a memory configured to store data for setting the signal value; and a detector configured to detect an actual movement amount of the driven member for each one-step drive of the stepping motor, wherein the memory is configured to store data for setting a signal value of a second drive signal which is different from a first drive signal having a reference signal as the signal value, wherein the driver is configured to produce the second drive signal, and wherein a difference between the target movement amount and the actual movement amount when the stepping motor is driven according to the second drive signal is smaller than a difference between the target movement amount and the actual movement amount when the stepping motor is driven according to the first drive signal.

* * * * *